March 29, 1938. A. L. MOON 2,112,633
WIND OPERATED ELECTRICAL GENERATING UNIT
Filed Aug. 17, 1936
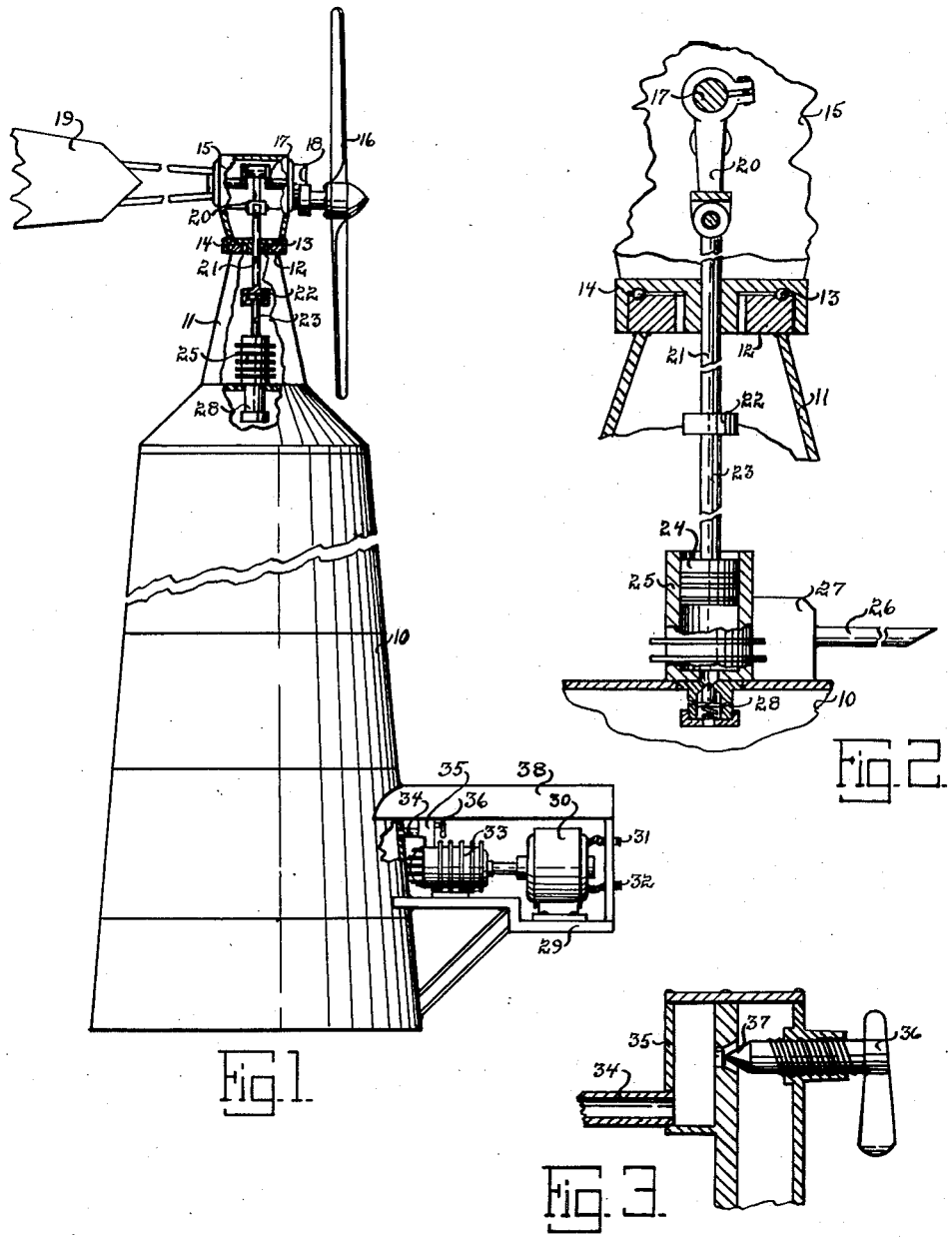
INVENTOR.
ARTHUR L. MOON
BY Maurice J. Fletcher
ATTORNEY.

Patented Mar. 29, 1938

2,112,633

UNITED STATES PATENT OFFICE 2,112,633

WIND OPERATED ELECTRICAL GENERATING UNIT

Arthur L. Moon, Milo, Iowa

Application August 17, 1936, Serial No. 96,410

1 Claim. (Cl. 290—55)

The principal object of my invention is to provide a wind operated electrical generating unit wherein a tank or container is filled with compressed air and controllably released into an air motor for driving an electrical generator.

A further object of this invention is to provide a wind operated electrical generating unit that continuously stores air and which will successfully operate the generator through prolonged periods of calm and when the wind actuated mechanism is not operating.

A still further object of this invention is to provide a wind operated electrical generating unit that is economical in manufacture and use; durable and efficient in construction.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side partial sectional view of my completely assembled wind operated generator unit.

Fig. 2 is an enlarged cross-sectional view of the wind operated compressor unit and more fully illustrates its construction.

Fig. 3 is an enlarged side sectional view of the air control valve for controlling the speed of the compressed air motor.

There has been a great need for an economically operated source of electricity for individual rural use. Several attempts have been made at individual rural electrification through the use of storage batteries and a gasoline operated, charging generator for the batteries. This type of apparatus is complicated, expensive and requires considerable upkeep. Furthermore, due to the bulk and size of batteries, it is inadvisable to generate more than 32 volts for farm use, making necessary special equipment for use on this current. The batteries deteriorate and must be replaced from time to time. As they are filled with liquid and acid, they are quite messy, and are apt to freeze in the cold weather. Several attempts have been made at running the generator for charging these batteries by wind power. However, it takes quite a prolonged generating period to restore the activities of the storage batteries and all of the disadvantages of storage battery use are applicable to this type of installation.

I have overcome these disadvantages as will be appreciated and as is hereinafter more fully set forth.

Referring to the drawing, I have used the numeral 10 to designate an air storage tank having a comparatively large capacity and being of air tight construction. This tank 10 also serves as a tower for the wind operated propeller. Secured to the upper end of the tank 10 is a combined standard and housing 11 which supports a ball bearing plate 12 which is ring-shaped and has a groove on its upper surface for containing ball bearings or the like 13. Rotatably mounted on these ball bearings 13 is the bearing plate 14 having a bearing near its center and having its marginal edge portion cupped and extending down past the marginal edge of the plate 12 to provide a shelter for the bearings and which is free to rotate independent of the plate 12.

Rigidly secured to the bearing plate 14 is a housing 15 in which is contained the operating mechanism as is hereinafter described. The numeral 16 designates an air operated impeller rotatably mounted on the housing 15 and operating a crank shaft 17 through the reduction gears 18 as shown in Fig. 1. The housing 15 has secured to its rear end portion the guiding fin 19 for directing the impeller 16 to the most advantageous position relative to the direction of the wind. The numeral 20 designates a connecting rod having one of its ends operatively, rotatably mounted on the crank shaft 17 and which has rotatably secured to its other end the pump rod 21 as shown in Fig. 2. This pump rod extends through and is bearinged in the bearing plate 14 at its center and has formed on its lower end a swivel housing 22 which receives the upper end of a pump rod 23. The purpose of this swivel is to allow the complete impeller and operating assembly to rotate with regard to wind direction without affecting the compressing mechanism. The lower end of the pump rod 23 is operatively secured to a piston 24 which in turn is operatively slidably mounted in a cylinder 25 of an ordinary air compressor. This air compressor is of the ordinary type having an intake 26 and a valve controlling mechanism 27 as shown in the drawing. This cylinder 25 communicates with the inside of the tank 10 through a one way valve 28 as shown in Fig. 2 of the drawing. Thus as the impeller 16 is rotated by the wind, it will actuate the crank shaft 17 which in turn will cause the connecting rod 20, the pump rod 21 and rod 23 to reciprocate thereby allowing the piston to suck air in through the intake 26 and compress it into the tank 10 through the valve 28.

The numeral 29 designates a platform rigidly secured near the lower end of the tank 10 and which supports an ordinary electrical generator 30 as shown in Fig. 1. The generator 30 has the ordinary lead wires 31 and 32 which are ordinarily connected into an electrical circuit. Mounted on the platform 29 is also an air operated motor 33 which is operatively secured to the generator 30. The numeral 34 designates an air pipe having one end in communication with the inside of the tank 10 and its other end in communication with a valve 35 which in turn is in operative communication with the motor 33.

By reference to Fig. 3 of the drawing, it will be noted that this valve 35 is of the manually operated type having the controlling lever 36 and the needle valve 37 for controlling the flow of air from the tank 10 through the motor 33. The numeral 38 designates a hood over the motor and generator unit for sheltering them from the elements.

The practical operation of my device is as follows: The tank 10, serving as a tower, is placed out of doors where it will take advantage of all prevailing winds. The wind striking the impeller will actuate the compressor, thereby filling the tank with air under pressure. This air is slowly released through the valve 35 into the motor 33 and actuates the same. The power thus derived actuates the low speed generator 30 allowing current to flow through the wires 31 and 32 into an electrical circuit for operating various electrical devices and lighting facilities.

As the impeller 16 will run at all times that there is a wind, a large volume of air will be compressed within the tank 10 and as only a small amount is necessary to operate the motor 33 a volume of air within the tank will run the motor through prolonged periods of calm, thus providing an even, smooth, and reliable source of electrical energy for individual rural use without the use of batteries or other bulky equipment. From the foregoing it will be seen that I have provided an air operated generating unit that is extremely economical in use, that derives its power from the air and which stores the air not used in actually generating current for future use. Furthermore, my device requires no upkeep, is foolproof and is of great utility as a source of inexpensive electric energy.

Some changes may be made in the construction and arrangement of my improved wind operated electrical generating unit witthout departing from the real spirit and purpose of my invention, and it is my intention to cover by my claims any modified forms of structure or use of mechanical equivalents which may be reasonably included within their scope.

I claim:

In a device of the class described, an elongated upright storage tank designed to hold a supply of air under pressure, a combined standard and housing secured to and extending upwardly from the upward end of said tank, a ring secured to the upper end of said standard, a plate rotatably mounted on said ring, a housing secured to said plate, an impeller blade rotatably mounted in said housing, a crank shaft operatively secured to said impeller blade, a connecting rod having one end secured to said crank shaft and its other end pivotally secured to one end of the pump rod; said pump rod extending downwardly and slidably mounted through said ring and said plate, a swivel joint in said pump rod below said ring and within said combined standard and housing, a compressing unit on said tank operated by said pump rod, a one-way valve in said tank for permitting air to be compressed within said tank by said compressing unit, an outlet in said tank, a manually operated valve in said outlet, and an air operated motor in communication with said outlet through said pump and designed to be operatively secured to an electrical generating unit; said valve for controlling the flow of air from said tank to said motor for the purpose of impelling said motor at a constant speed.

ARTHUR L. MOON.